United States Patent Office 2,887,511
Patented May 19, 1959

2,887,511

PREPARATION OF AROMATIC ACIDS BY OXIDATION

William L. Wasley, Santa Ana, Calif., assignor to Union Oil Company of California, Los Angeles, Calif., a corporation of California No Drawing. Application January 26, 1953
Serial No. 333,349

7 Claims. (Cl. 260—524)

This invention relates to a novel method of preparing carboxylic acids by the catalytic liquid phase oxidation of alkyl substituted benzenes and alkyl substituted naphthalenes. More particularly, this invention relates to the liquid phase oxidation of alkyl substituted benzenes and naphthalenes by means of oxygen, air or other gas containing free oxygen in the presence of a thallous compound to produce mono-carboxylic acids.

It has been found that various thallous compounds, as for example, thallous oxide, thallous hydroxide, and the organic thallous salts such as the acetate, propionate, butyrate, benzoate, toluate, naphthenate, naphthoate, oleate, and the like, are active catalysts for the oxidation of aromatic compounds of the benzene and naphthalene series, having alkyl side chains, to produce the corresponding mono-carboxylic acid derivatives. Furthermore, it is found that these thallous compounds direct the oxidation reaction to the production of mono-carboxylic acid derivatives to the substantial exclusion of dicarboxylic acids. The thallous salts are sufficiently soluble in the aromatic hydrocarbon to permit separation of acidic products from the oxidation product or partial oxidation product without removal of appreciable quantities of the thallous salts so that after removal of the mono-carboxylic acid from a partially oxidized product, the unoxidized aromatic hydrocarbon may be further oxidized without the necessity for adding additional quantities of catalyst. Moreover, it has been found that the catalytic activity of the mentioned thallous compounds in the oxidation reactions described is good and the reaction catalyzed with these compounds results in relatively high conversions and high yields of mono-carboxylic acids for a given set of oxidation conditions, as for example, temperature, pressure, rate of blowing with oxygen or gas containing oxygen, and the like. Presumably when thallous oxide or hydroxide is used as the catalytic agent it reacts with acid produced in the oxidation to form salts of the acid and these salts serve as oxidation catalysts. It is possible also that when organic salts are used as catalysts, these salts may be converted to some extent at least, to salts of the acid or acids formed in the oxidation.

Thus, it is an object of this invention to provide a process for oxidizing alkyl substituted benzenes and naphthalenes in the liquid phase to produce mono-carboxylic aromatic acids using a thallous compound as the oxidation catalyst.

It is another object of this invention to provide a process for the liquid phase oxidation of alkyl substituted aromatic compounds of the class consisting of alkyl substituted benzenes and alkyl substituted naphthalenes to produce mono-carboxylic acid derivatives thereof, which comprises flowing the aromatic hydrocarbon with a gas containing free oxygen in the presence of a thallous compound.

It is a particular object of this invention to provide a process for the liquid phase oxidation of alkyl substituted benzenes in the presence of a thallous compound to produce mono-carboxylic acid derivatives of said alkyl substituted benzenes.

A specific object of this invention is to provide a process for the liquid phase oxidation of para-xylene to produce para-toluic acid using a thallous compound as a catalyst for the process.

In carrying out the oxidation employing thallous compounds as the catalytic agents, any kind of apparatus which is suitable for effecting liquid phase oxidation may be employed. Generally, such apparatus consists of an oxidation chamber made of stainless steel, glass lined steel, or other material resistant to the action of acids and capable of withstanding pressure, means for controlling temperature, such as for example, pipe or tubing coils, surrounding the oxidation chamber or positioned within the oxidation chamber, through which may be passed a heating medium, such as steam or other heat transfer medium, or a cooling medium to remove heat of reaction after the oxidation has been initiated. The vessel is fitted with an air inlet device which is desirably located at a point near the bottom of the vessel and which preferably is capable of dispersing oxygen, air, or other oxidizing gas in the liquid being oxidized. Thus, the air may be injected through a porous plate, e.g. a frittered glass or ceramic plate, or the gas may be dispersed in the reaction medium by means of a high speed stirrer. An outlet located near the top of the oxidation vessel is generally fitted with a condenser so that liquid products leaving the oxidation zone may be returned to the vessel and the waste gases discarded.

The oxidation may be carried out batchwise or in a continuous manner as is well known in the art. One means of effecting continuous oxidation is to remove continuously or intermittently a portion of the charge from the oxidation vessel and pass it through a recovery system in which the product of oxidation, i.e. the mono-carboxylic acid, is separated from the unoxidized aromatic hydrocarbon. The recovery system may merely involve a cooler in which the carboxylic acid produced is caused to solidify or crystallize, followed by a centrifuge or filter designed to remove the solid acid product. The filtrate or the liquid from the centrifuge is returned to the oxidation vessel for further oxidation with or without the addition of further quantities of aromatic hydrocarbon feed and, when necessary, additional quantities of catalyst.

The oxidation is carried out at a temperature of between about 100° C. and about 160° C. and preferably between about 120° C. and about 150° C. Oxygen, air or other gas containing free oxygen, as for example, oxygen enriched air, is supplied at a rate such that only a small amount of the oxygen is not utilized, i.e. is found in the exit gas stream from the oxidizer. The oxidation may be effected at ordinary atmospheric pressures although the rate may be increased by employing super-atmospheric pressures. Thus, pressures from about 0.0 to about 200 pounds gage or even as high as 500 pounds gage may be successfully employed.

The amount of catalyst to be used will depend to some extent upon the particular aromatic hydrocarbon being oxidized, the pressure and temperature used and the rate of oxidation desired. However, generally the amount of thallous oxide, hydroxide, as salt employed will be between about 0.05% and about 2% by weight of the aromatic hydrocarbon charge, preferably between about 0.1% and 1% by weight of the oxidation charge.

Aromatic compounds which may be oxidized to produce mono-carboxylic acids according to this invention, using a thallous compound as the oxidation catalyst include the alkyl substituted benzenes and alkyl substituted naphthalenes, having at least one methyl group and particularly those alkyl substituted benzenes and naphthalenes having from 1 to about 4 alkyl substituents. The preferred aromatic compounds are the methyl benzenes having 1 to 4 methyl substituents. Thus, aromatic compounds which may be utilized in the process of this invention include toluene, the xylenes, the methyl ethyl benzenes, methyl propyl and methyl isopropyl benzenes, the trimethyl and tetramethyl benzenes and higher homologs. This group of compounds includes also the methyl naphthalenes, the di, tri and tetra methyl naphthalenes and higher homologs.

It is to be understood that although the rate of oxidation and the yields and conversions will vary depending upon the condition of oxidation and upon the particular alkyl substituted aromatic compound being oxidized, the conditions for effecting oxidation described herein are applicable to all of the aromatic compounds disclosed and in each case, upon oxidation, there is produced a mono-carboxylic acid corresponding to the alkyl substituted benzene or naphthalene which is oxidized.

The following examples will serve to illustrate this invention, but are not to be taken as limiting, since other thallous salts and other aromatic hydrocarbons containing alkyl substituents may be oxidized in a manner similar to that described herein to produce corresponding mono-carboxylic gases.

*Example I*

A mixture of 40 grams of para-xylene and 0.4 gram of thallous acetate is placed in a glass flask, fitted with a reflux condenser, and oxygen is bubbled through the solution at the rate of approximately 2 liters per hour, with the solution at a temperature of 130° C., for 1.5 hours. Oxidation is discontinued at this point and the oxidized material cooled and filtered. The crystalline product removed by filtration, washed on the filter with two 3 ml. portions of para-xylene and dried by heating in an oven at 80° C. for 2 hours amounts to 11.0 grams, is white in color and melts at 177° C. This product is para-toluic acid.

The combined filtrate and washings are returned to the oxidation flask and without further addition of catalyst, oxygen is again bubbled through the solution for 2 hours at the rate of 2 liters per hour, with the solution at a temperature of 130° C. The product is again cooled and filtered and the crystalline material washed on the filter with two 3 ml. portions of xylene. When dried as above, the para-toluic acid recovered amounts to 10.5 grams, is white in color and melts at 176–177° C.

*Example II*

A solution of 0.03 gram of thallous acetate in 30 grams of para-xylene, oxidized under the conditions employed in Example I, yields the same amounts of para-toluic acid as those obtained in Example I.

*Example III*

A mixture of 40 grams of para-xylene and 0.5 gram of thallous para-toluate, oxidized in the manner described in Example I, results in the production of para-toluic acid in amounts similar to those described in Example I.

*Example IV*

Meta-xylene, oxidized in the manner described in Example I, except that a temperature of 130° C. is employed and 0.3% by weight of thallous hydroxide is employed as catalyst, gives good yields of meta-toluic acid.

*Example V*

A mixture of 40 grams of durene and 0.1 gram of thallous propionate is blown with oxygen at a temperature of 155° C. for 3 hours. A mono-carboxylic acid is separated from the reaction product by cooling and filtering.

*Example VI*

A mixture of 40 grams of 1,4-dimethyl naphthalene and 0.4 gram of thallous hydroxide is oxidized under the conditions described in Example I and there is produced 7 grams of 4-methyl naphthoic acid which is separated from the oxidation product by filtration.

The foregoing description of my invention is not to be taken as limiting my invention but only as illustrative thereof since many variations may be made by those skilled in the art without departing from the scope of the following claims.

I claim:

1. A process for producing aromatic mono-carboxylic acids which comprises oxidizing an aromatic compound of the class consisting of alkyl substituted benzenes and alkyl substituted naphthalenes in which at least one alkyl substituent is a methyl group, in the liquid phase at temperatures between about 100° C. and 160° C. with a gas containing free oxygen in the presence of a thallous compound dissolved in the reaction mixture.

2. A process for producing aromatic mono-carboxylic acids which comprises oxidizing an alkyl substituted benzene having at least one methyl group in the liquid phase at a temperature between 100° C. and 160° C. with a gas containing free oxygen in the presence of a thallous compound dissolved in the reaction mixture.

3. A process for producing aromatic mono-carboxylic acids which comprises oxidizing an alkyl substituted benzene in the liquid phase at a temperature between 100° C. and 160° C. with a gas containing free oxygen in the presence of a catalytic material consisting of an organic thallous salt dissolved in the oxidation mixture, said catalytic material being originally present as a thallous compound of the class consisting of thallous oxide, thallous hydroxide and a thallous organic salt.

4. A process for producing para-toluic acid which comprises oxidizing para-xylene in the liquid phase at a temperature between 120° C. and 150° C. with a gas containing free oxygen in the presence of a thallous compound dissolved in the reaction mixture.

5. A process according to claim 4 in which said thallous compound is thallous acetate.

6. A process acording to claim 4 in which said thallous compound is thallous para-toluate.

7. A process according to claim 1 in which said aromatic compound is 1,4-dimethyl naphthalene.

References Cited in the file of this patent

UNITED STATES PATENTS

| | | |
|---|---|---|
| 1,771,169 | Egerton | July 22, 1930 |
| 1,815,985 | Pansegrau | July 28, 1931 |
| 1,851,362 | Jaeger | Mar. 29, 1932 |
| 2,245,528 | Loder | June 10, 1941 |
| 2,353,158 | Hull | July 11, 1944 |
| 2,578,654 | Hearne et al. | Dec. 18, 1951 |

FOREIGN PATENTS

| | | |
|---|---|---|
| 364,442 | Germany | Nov. 25, 1922 |